Patented Sept. 26, 1939

2,173,826

UNITED STATES PATENT OFFICE 2,173,826

MAKING CALCIUM METAPHOSPHATE FERTILIZER

Harry A. Curtis, Knoxville, Tenn.

No Drawing. Application February 15, 1938, Serial No. 190,625

4 Claims. (Cl. 23—108)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the process of making calcium metaphosphate, which is available as a plant food, particularly from rock phosphate and phosphoric acid.

One of the objects of this invention is to provide a method for making a highly concentrated plant food by the use of dilute phosphoric acid, such as produced by the wet process. Another object of this invention is to provide a continuous and rapid process for the production of concentrated plant food. Still another object of this invention is to provide a method for the production of a highly concentrated fertilizer which, for the most part, utilizes raw materials and equipment which are already available. Other objects of this invention include the provision of an economical means for converting monocalcium phosphate, which is available as a plant food, into a more highly concentrated plant food.

Hitherto it has been the general practice to treat rock phosphate with sulfuric acid and thereby produce a superphosphate containing 16 to 20% by weight of $P_2O_5$ available as plant food. A more recent development, which has resulted in the production of a small proportion of phosphatic fertilizer in a more concentrated form, is to treat rock phosphate with phosphoric acid and thereby produce a double or triple superphosphate containing 40 to 45% by weight of $P_2O_5$ available as plant food. A still more recent development is to treat rock phosphate with phosphorus pentoxide and thereby produce a still more concentrated phosphatic fertilizer containing 60 to 70% by weight of $P_2O_5$ available as plant food. This latter process, however, requires substantially different and expensive equipment for its operation. It is, therefore, particularly desirable to utilize the general available raw materials and the maximum amount of existing equipment to produce a more economical material, namely, a more highly concentrated phosphatic fertilizer.

I have discovered a process of making calcium metaphosphate which is available as a plant food from a calcium containing material, which is reactive with phosphoric acid to produce monocalcium phosphate, and phosphoric acid by mixing the fine calcium containing material and the phosphoric acid, by permitting the mixture to at least partially set, by feeding the mixture into a heated zone and by maintaining a sufficient temperature gradient in the heated zone successively to remove the free water from the mixture and produce monocalcium phosphate, to convert the monocalcium phosphate into a calcium metaphosphate, which is only partially available as a plant food, and to fuse the calcium metaphosphate making it available as a plant food.

It is evident that there are numerous factors which will influence conditions for the most satisfactory operation of my invention, the actual limits of which cannot be established except by a detailed study of each set of raw materials and the intermediate and finished products involved.

The availability of the $P_2O_5$ in monocalcium phosphate is well known, but several investigators have reported that calcium metaphosphate contained only a portion of its $P_2O_5$ in a form available as plant food. It has been found that monocalcium phosphate may be dehydrated to calcium metaphosphate under a variety of conditions with the general result that the $P_2O_5$ in the product is, at most, only partly available as plant food. This may be accomplished by heating at a single temperature, such as 300° C. or 400° C., for an extended period of time, or by heating the original monocalcium phosphate through a constantly increasing temperature range of several hundred degrees centigrade. The calcium metaphosphate so produced, and containing its $P_2O_5$ in an only partially available form, may be further heated through an increasing temperature range until it is fused, whereupon practically all of its $P_2O_5$ content becomes available. The changes in the availability of the $P_2O_5$ through the range from monocalcium phosphate to fused calcium metaphosphate, in which the monocalcium phosphate was heated under uniform conditions at the intermediate temperatures, are indicated by the results recorded in the following table:

| Temperature, °C. | $P_2O_5$ | |
|---|---|---|
| | Total percent | Citrate soluble percent of total |
| 300 | 56.3 | 99.6 |
| 360 | 70.2 | 59 |
| 385 | 71.0 | 55 |
| 420 | 71.6 | 48 |
| 500 | 71.0 | 33 |
| 600 | 71.2 | 30 |
| 1000 | 72.0 | 32 |
| | 71.6 | 99.4 |

The calcium containing material used in my process may be any material which is reactive with phosphoric acid to produce monocalcium phosphate. Ordinarily rock phosphate is preferred for this purpose but limestone, or any other readily available calcium containing material, may be equally suitable.

The phosphoric acid used in my process may be either a dilute or a concentrated acid. Commercially, the dilute acid containing 30 to 45% by weight of $H_3PO_4$ is produced by the wet process, that is, by the treatment of rock phosphate and sulfuric acid. The concentrated phosphoric acid, usually considered as containing at least 65% by weight of $H_3PO_4$, may be obtained by direct concentration of the dilute wet process acid or, as is more commonly the case, by electro-thermal methods.

The dilute phosphoric acid, or concentrated phosphoric acid, is mixed with the calcium containing material, preferably rock phosphate, to form a mixture which is to be charged to a heated zone. It is preferable to permit this initial mixture to stand a sufficient time for it to at least partially set. When, for example, concentrated acid is used, the few minutes time required for conveying the mixture from the mixer to the heating zone, on equipment such as a belt conveyer, is sufficient for the purpose. It is not necessary that this mixture be stored in the conventional manner to obtain the ultimately substantially complete conversion of the rock phosphate into monocalcium phosphate, although this procedure may be used if desired.

The mixture of rock phosphate and phosphoric acid is charged into a heated zone, at least a portion of which is capable of being heated to at least the melting point of the fused calcium metaphosphate subsequently produced. Pure calcium metaphosphate melts at 975° C., while the commercial product may melt below or above this temperature, depending upon the impurities present. However, the zone of highest temperature should be so controlled that the fused product withdrawn therefrom has attained a temperature of the order of 1000 to 1200° C. The entire heated zone may be one which may be operated with a substantial temperature gradient between the entrance and exit of the zone, such as in the case of a rotary kiln. It is sometimes necessary to alternately vary the location of the higher temperature zones slightly in the rotary kiln in order to remove ring-like masses of the calcium metaphosphate from the temperature zone in which this material becomes highly plastic just prior to fusion. The heating may be carried out stepwise: for example, the initial portion of the heating carried out in a rotary kiln in which the maximum temperature is below the fusion point of the calcium metaphosphate and the intermediate product so obtained then charged to a melting furnace in which the actual melting of the charge is obtained.

Regardless of the equipment in which it is found desirable to carry out the heating operation, the mixture of the calcium containing material and the phosphoric acid is heated under conditions such as successively to remove the free water from the mixture and produce monocalcium phosphate, to convert the monocalcium phosphate into calcium metaphosphate, which is only partially available as a plant food, and to fuse the calcium metaphosphate thereby making it available as a plant food.

It will be seen, therefore, that this invention actually may be carried out by the use of various modifications and changes without departing from its spirit and scope, with only such limitations placed thereon as are imposed by the prior art.

I claim:

1. Process of making calcium metaphosphate which is entirely and readily available as plant food from a calcium containing material, reactive with phosphoric acid to produce monocalcium phosphate, and phosphoric acid which comprises making a mixture of the fine calcium containing material and an aqueous solution of phosphoric acid containing 30 to 45% by weight of $H_3PO_4$, in substantially stoichiometrical proportion for the formation of monocalcium phosphate; feeding the mixture through a plurality of heated zones; maintaining the heated mixture at an increasing temperature gradient up to 1000 to 1200, C. adapted successively to remove the free water from the mixture and produce monocalcium phosphate, to convert the monocalcium phosphate into a calcium metaphosphate, which is only partially available as a plant food, and to fuse the calcium metaphosphate thereby making it entirely and readily available as a plant food and cooling the fused calcium metaphosphate to solidify the same and maintain it readily available as plant food.

2. Process of making calcium metaphosphate which is entirely and readily available as plant food from a calcium containing material, reactive with phosphoric acid to produce monocalcium phosphate, and phosphoric acid which comprises making a mixture of the fine calcium containing material and an aqueous solution of phosphoric acid, in substantially stoichiometrical proportion for the formation of monocalcium phosphate; feeding the mixture through a plurality of heated zones; maintaining the heated mixture at an increasing temperature gradient up to 1000 to 1200° C. adapted successively to remove the free water from the mixture and produce monocalcium phosphate, to convert the monocalcium phosphate into a calcium metaphosphate, which is only partially available as a plant food, and to fuse the calcium metaphosphate thereby making it entirely and readily available as a plant food and cooling the fused calcium metaphosphate to solidify the same and maintain it readily available as plant food.

3. Process of making calcium metaphosphate which is entirely and readily available as plant food from a calcium containing material, reactive with phosphoric acid to produce monocalcium phosphate, and phosphoric acid which comprises making a mixture of the fine calcium containing material and an aqueous solution of phosphoric acid, in substantially stoichiometrical proportion for the formation of monocalcium phosphate; feeding the mixture through a plurality of heated zones; maintaining the heated mixture at an increasing temperature gradient adapted successively to remove the free water from the mixture and produce monocalcium phosphate, to convert the monocalcium phosphate into a calcium metaphosphate, which is only partially available as a plant food, and to fuse the calcium metaphosphate thereby making it entirely and readily available as a plant food and cooling the fused calcium metaphosphate to solidify the same and maintain it readily available as plant food.

4. Process of making calcium metaphosphate which is entirely and readily available as plant food from a calcium containing material, reactive with phosphoric acid to produce monocalcium phosphate, and phosphoric acid which comprises making a mixture of the fine calcium containing material and an aqueous solution of phosphoric acid, in substantially stoichiometrical proportion for the formation of monocalcium phosphate; heating the mixture through an increasing temperature gradient adapted successively to dehydrate the mixture and to form an unfused calcium metaphosphate, and to fuse the calcium metaphosphate, thereby making it entirely and readily available as a plant food; and cooling said fused calcium metaphosphate to solidify the same and to maintain it readily available as a plant food.

HARRY A. CURTIS.